United States Patent
Kato et al.

(10) Patent No.: US 7,177,254 B2
(45) Date of Patent: Feb. 13, 2007

(54) OPTICAL RECORDING METHOD FOR HIGH TRANSFER RATES

(75) Inventors: Tatsuya Kato, Chuo-ku (JP); Hajime Utsunomiya, Chuo-ku (JP); Hideki Hirata, Chuo-ku (JP)

(73) Assignee: TDK Corporation, Tokyo (JP)

( * ) Notice: Subject to any disclaimer, the term of this patent is extended or adjusted under 35 U.S.C. 154(b) by 854 days.

(21) Appl. No.: 10/109,594

(22) Filed: Mar. 27, 2002

(65) Prior Publication Data

US 2003/0063540 A1 Apr. 3, 2003

(30) Foreign Application Priority Data

Mar. 28, 2001 (JP) ............................. 2001-093743

(51) Int. Cl.
*G11B 7/0045* (2006.01)
*G11B 20/10* (2006.01)
*G11B 7/00* (2006.01)

(52) U.S. Cl. ................. 369/59.11; 369/47.51; 369/116; 369/47.5

(58) Field of Classification Search ............ 369/13.56, 369/18, 47.51, 116, 59.11, 59.1
See application file for complete search history.

(56) References Cited

U.S. PATENT DOCUMENTS

| 5,038,338 A | 8/1991 | Terao et al. ............. 369/116 |
| 5,802,032 A * | 9/1998 | Jacobs et al. ............ 369/59.11 |
| 5,835,250 A | 11/1998 | Kanesaka ................ 359/183 |
| 5,959,943 A * | 9/1999 | Yonezawa et al. ....... 369/13.35 |
| 6,285,647 B1 * | 9/2001 | Van Woudenberg et al. .............. 369/116 |
| 6,343,056 B2 * | 1/2002 | Miyamoto et al. ....... 369/59.11 |
| 6,480,450 B1 * | 11/2002 | Fujii et al. .............. 369/59.12 |
| 6,548,137 B2 * | 4/2003 | Ito et al. ................ 428/64.1 |
| 6,751,513 B1 * | 6/2004 | Spruit .................... 700/94 |
| 6,873,586 B2 * | 3/2005 | Yamaguchi et al. ..... 369/53.26 |
| 6,891,782 B1 * | 5/2005 | Saito et al. ............. 369/44.29 |
| 2001/0012253 A1 * | 8/2001 | Ohno .................... 369/59.11 |

FOREIGN PATENT DOCUMENTS

| JP | 1-229426 | 9/1989 |
| JP | 8-287465 | 11/1996 |
| JP | 09-007176 | 1/1997 |

\* cited by examiner

*Primary Examiner*—Wayne Young
*Assistant Examiner*—Parul Gupta
(74) *Attorney, Agent, or Firm*—Seed IP Law Group PLLC

(57) ABSTRACT

An optical recording method that performs recording by irradiating optical recording media with laser beam modulated in intensity based on a write waveform is provided. The write waveform has a plurality of write pulse blocks for forming write marks, and each write pulse block has at least one type of upward pulse. In the event that the width of said upward pulse is so narrow that the laser beam intensity corresponding to the peak intensity of that upward pulse cannot be obtained, the peak intensity of that upward pulse is increased so that, in said laser beam, the beam intensity it should have or a value close thereto is obtained. Thereby, good recording and playback characteristics can be obtained even when recording at a high transfer rate.

6 Claims, 9 Drawing Sheets

LIGHT-EMISSION WAVEFORM

OPTICAL RECORDING METHOD FOR HIGH TRANSFER RATES

BACKGROUND OF THE INVENTION

The present invention relates to a method of recording on optical recording media at a high transfer rate.

DESCRIPTION OF THE PRIOR ART

Optical recording media that permits high-density recording and also permits the recorded information to be erased and rewritten have been attracting attention in recent years. Among rewritable optical storage media, the phase-change technology involves irradiating the media with at least a laser beam to change the crystal state of the recording layer to perform recording and detecting the change in the crystalline state of the recording layer accompanying this state change to perform playback. Phase-change type optical recording media is attracting attention because the optical system of the drive is simpler than that for magneto-optical recording media.

When recording information onto phase-change type optical recording media, the recording layer is irradiated with a high-power (write power) laser until it is above its melting point. Once the recording layer is melted in the portion where the write power is applied, it cools rapidly to form an amorphous write mark. On the other hand, when erasing write marks, the recording layer is irradiated with a relatively low-power (erase power) laser which heats it to a temperature above its crystallization temperature but below the melting temperature. When the erase power is applied, recording marks are heated to above their crystallization temperature and then cooled gradually, so they return to the crystalline state. Accordingly, with phase-change type optical recording media, overwriting is possible by modulating the intensity of the same laser beam.

At the time of recording to phase-change type optical recording media, rather than performing DC irradiation with laser beam corresponding to the length of the recording mark, as recited in the publication of unexamined Japanese patent application (Kokai) No. JP-A-9-7176, typically the irradiation is performed as a pulse train in order to control the recording mark shape. The specific constitution of this pulse train is called the write waveform.

In recent years, demand has increased for recording on optical recording media at high transfer rates for video recording or the like. The higher the transfer rate, the higher the frequency of the recording signal becomes. Moreover, when laser beam is modulated into pulse trains and irradiated, the time width of the individual pulses that make up the pulse train becomes extremely short.

On the other hand, laser diodes take a certain amount of time from when the drive current is applied until their beam intensity reaches the intensity corresponding to that current value, and the laser driver that supplies the drive current to the laser diode takes a certain amount of time to raise the drive current to the stipulated value. Accordingly, even if one attempts to use an extremely short pulse waveform for the laser beam in order to increase the transfer rate, the laser beam intensity corresponding to each pulse attenuates before reaching the recording power. To wit, laser beam emission that strictly conforms to the write waveform cannot be obtained. As a result, the heating of the recording layer is inadequate so the recording marks may be warped in shape or too small, and as a result, jitter in the playback signal may become large or the playback amplitude may become lower.

SUMMARY OF THE INVENTION

It is therefore an object of the present invention to solve the problems that occur when recording on optical recording media at a high transfer rate.

Another object of the present invention is to provide an optical recording method that can accurately achieve the desired write waveform.

The aforementioned objects are achieved by the following aspects (1)–(6) of the present invention.

(1) An optical recording method that performs recording by irradiating optical recording media with laser beam modulated in intensity based on a write waveform, wherein:

said write waveform has a plurality of write pulse blocks for forming write marks, and each write pulse block has at least one type of upward pulse, and in the event that the width of said upward pulse is so narrow that the laser beam intensity corresponding to the peak intensity of that upward pulse cannot be obtained, the peak intensity of that upward pulse is increased so that, in said laser beam, the beam intensity it should have or a value close thereto is obtained.

(2) An optical recording method that performs recording by irradiating optical recording media with laser beam modulated in intensity based on a write waveform, wherein:

said write waveform has a plurality of write pulse blocks for forming write marks, and each write pulse block has at least one type of upward pulse, a rise time of said laser beam is defined as $T_R$ and a time width of said upward pulse is as defined $T_{UP}$, and when at least one type each of an upward pulse wherein $T_{UP} \leq kT_R$ (where k=1.5) and an upward pulse wherein $T_{UP} > kT_R$ are present in said write waveform, the peak intensity of the upward pulses wherein $T_{UP} \leq kT_R$ is increased to above the peak intensity of the upward pulses wherein $T_{UP} > kT_R$.

(3) An optical recording method according to (2) above, wherein when at least two types of upward pulses wherein $T_{UP} \leq kT_R$ and that have a different $T_{UP}$ are present in said write waveform, these upward pulses are divided into at least two groups depending on the length of their $T_{UP}$ so that each group contains at least one type of upward pulse, the peak intensities of the upward pulses in each group are made identical, and the peak intensity in groups that contain upward pulses with a relatively short $T_{UP}$ is made larger than the peak intensity in groups that contain upward pulses with a relatively long $T_{UP}$.

(4) An optical recording method according to (2) above, wherein when at least two types of upward pulses wherein $T_{UP} \leq kT_R$ and that have a different $T_{UP}$ are present in said write waveform, the peak intensity is made the same in all of these upward pulses.

(5) An optical recording method that performs recording by irradiating optical recording media with laser beam modulated in intensity based on a write waveform, wherein:

said write waveform has a plurality of write pulse blocks for forming write marks, and each write pulse block has at least one type of upward pulse, a rise time of said laser beam is defined as $T_R$ and a time width of said upward pulse is as defined $T_{UP}$, and when upward pulses wherein $T_{UP} \leq kT_R$ (where k=1.5) are present in said write waveform, the peak intensity of these upward pulses is increased so that, in said laser beam, the beam intensity it should have or a value close thereto is obtained.

(6) An optical recording method that performs recording by irradiating optical recording media with laser beam modulated in intensity based on a write waveform, wherein:

said write waveform has a plurality of write pulse blocks for forming write marks, and each write pulse block has at least one type of upward pulse, a rise time of said laser beam is defined as $T_R$ and a time width of said upward pulse is defined as $T_{UP}$; and when all of the upward pulses contained in said write waveform have $T_{UP} \leq kT_R$ (where k=1.5), these upward pulses are divided into at least two groups depending on the length of their $T_{UP}$ so that each group contains at least one type of upward pulse, the peak intensities of the upward pulses in each group are made identical, and the peak intensity in groups that contain upward pulses with a relatively short $T_{UP}$ is made larger than the peak intensity in groups that contain upward pulses with a relatively long $T_{UP}$.

The aforementioned objects of the present invention are also achieved by an optical recording method that performs recording by irradiating optical recording media with laser beam modulated in intensity based on a write waveform, wherein peak values of upward pulses contained in said write waveform are set based on the respective pulse widths The aforementioned objects of the present invention are also achieved by an optical recording method that performs recording by irradiating optical recording media with a laser beam modulated in intensity based on a write waveform, wherein when a pulse width of a first upward pulse contained in said write waveform is shorter than a pulse width of a second upward pulse contained in said write waveform, the peak value of said first upward pulse is set higher than the peak value of said second upward pulse.

The aforementioned objects of the present invention are also achieved by an optical recording method that performs recording by irradiating optical recording media with laser beam modulated in intensity based on a write waveform comprising a top pulse, last pulse and multi-pulses, wherein a peak value of said multi-pulses is set higher than a peak value of said top pulse.

In a preferred embodiment of the present invention, a pulse width of said multi-pulses is shorter than a pulse width of said top pulse.

In an even more preferred embodiment of the present invention, a peak value of said top pulse is equal to a peak value of said last pulse.

DESCRIPTION OF THE PREFERRED EMBODIMENTS

Preferred embodiments of the present invention will now be explained with reference to the drawings.

Figure 1:
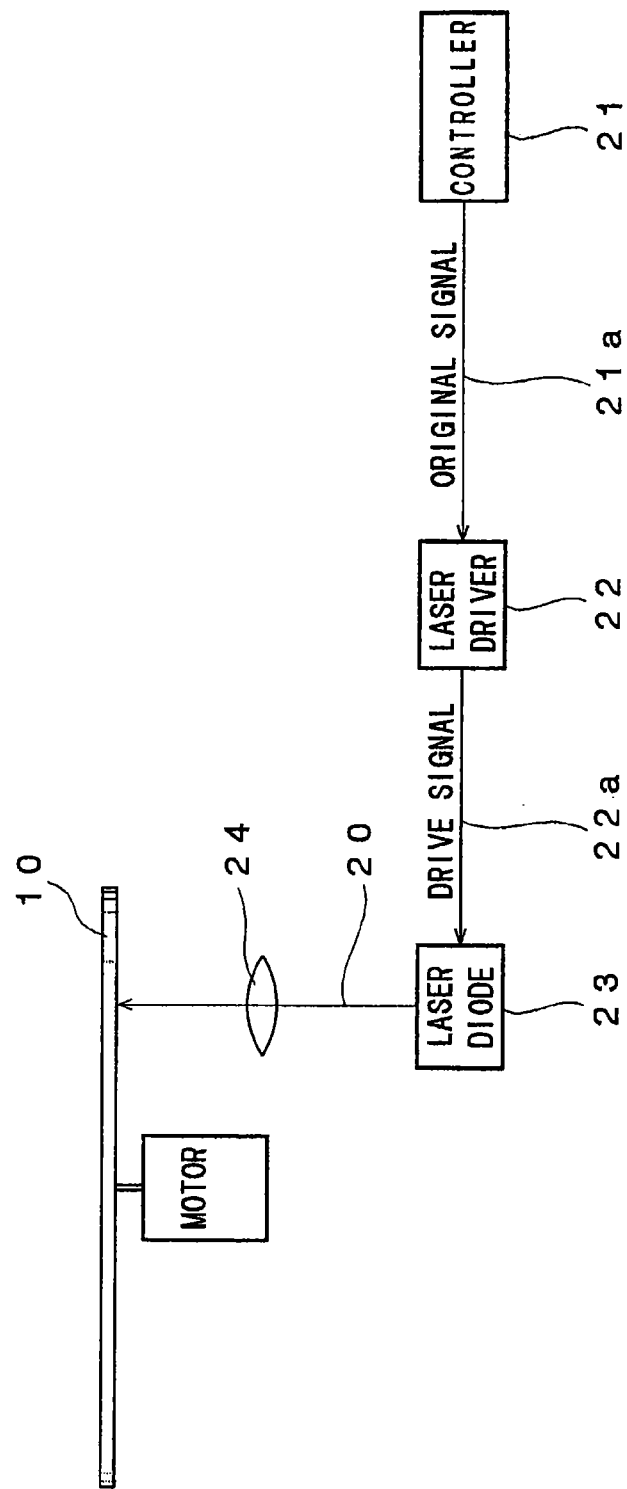
FIG. 1 is a schematic block diagram of the path of generation of laser beam that irradiates optical recording media.

FIG. 1 is a schematic block diagram of the path of generation of laser beam that irradiates optical recording media.

As shown in FIG. 1, laser beam 20 is generated using a controller 21, laser driver 22 and laser diode 23, and the optical recording media 10 is irradiated with the generated laser beam 20 via an optical system 24. The controller 21 is a circuit that generates the original signal 21a for the waveform of the laser beam 20, and this original signal 21a is supplied to the laser driver 22. In this Specification, the waveform of the laser beam 20 is called the "light-emission waveform" while the current waveform of the original signal 21a is called the "write waveform." The laser driver 22 is a circuit that receives the original signal 21a and generates a drive signal 22a based thereupon. The current waveform of the drive signal 22a corresponds to the write waveform of the original signal 21a supplied from the controller 21, but a stipulated amount of delay is present in the drive operation of the laser driver 22, so a small amount of delay occurs with respect to the write waveform. In this Specification, the current waveform of the drive signal 22a is called the "drive current waveform." The laser diode 23 is a diode that receives this drive signal 22a and generates the laser beam 20 based thereupon. While there is no particular limitation, a semiconductor laser is preferably used.

Figure 2:
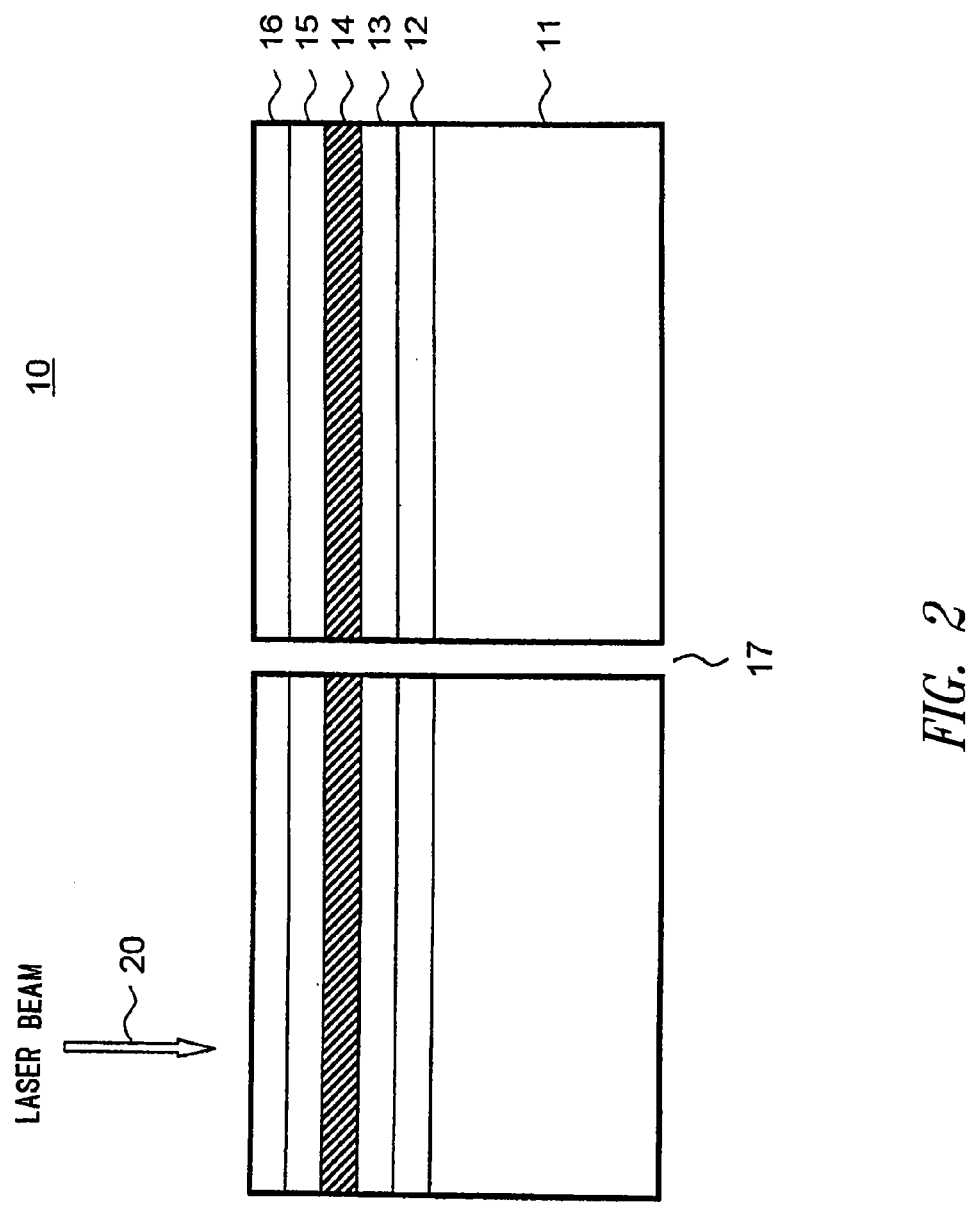
FIG. 2 is a cross section of one example of the structure of the optical recording media 10.

FIG. 2 is a cross section of one example of the structure of the optical recording media 10.

The optical recording media 10 in the example shown in FIG. 2 consists of: a substrate 11, a reflective layer 12 provided upon the substrate 11, a second dielectric layer 13 provided upon the reflective layer 12, a recording layer 14 provided upon the second dielectric layer 13, a first dielectric layer 15 provided upon the recording layer 14, a transparent cover layer 16 provided upon the first dielectric layer 15 and a hole 17 provided in the central portion of the optical recording media 10. With optical recording media 10 having such a structure, the recording/playback of data is performed by irradiation with laser beam from the side of the transparent cover layer 16.

The substrate 11 serves the role of a substrate that maintains the mechanical strength required of the optical recording media 10, and its thickness is preferably set to approximately 1.2 mm. In addition, there is no particular limitation to the material of the substrate 11, but polycarbonate can be used.

The reflective layer 12 serves the role of reflecting the laser beam 20 incident from the transparent cover layer 16 side and back out from the transparent cover layer 16, and its thickness is preferably set in the range 10–300 nm. There is no particular limitation to the material of the reflective layer 12, but an alloy with silver as its main component is preferably used.

The second dielectric layer 13 mainly serves the role of a protective layer for the recording layer 14 formed thereupon, and its thickness is preferably set in the range 2–50 nm. There is no particular limitation to the material of the second dielectric layer 13, as $Al_2O_3$, $ZnS+SiO_2$, $CeO_2$, $Y_2O_3$, AlN or the like can be used.

The recording layer 14 consists of phase-change material in which the recording of data is performed by utilizing the difference between its reflectance in the crystalline state and its reflectance in the amorphous state. In order to change the recording layer 14 from the crystalline state to the amorphous state, the laser beam 20 incident from the transparent cover layer 16 is given a pulse waveform having an amplitude from the write power ($P_w$) to the bottom power ($P_{bo}$), thus heating the recording layer 14 to above its melting point, and then the intensity of this laser beam 20 is set to the bottom power ($P_{bo}$) for rapid cooling. Thereby, the region melted by the write power ($P_w$) is changed to the amorphous state, and this becomes a write mark. On the other hand, in order to change the recording layer 14 from the amorphous state to the crystalline state, the laser beam 20 incident from the transparent cover layer 16 is set to the erase power ($P_{bi}$), thus heating the recording layer 14 to above the crystallization temperature. Thereby, the region heated to above the crystallization temperature by the erase power ($P_{bi}$) is gradually cooled by the laser beam 20 leaving thereafter, and this region changes to the crystalline state.

Here the relationship among the write power $P_w$, erase power $P_{bi}$ and bottom power $P_{bo}$ is set as follows:

$$P_w > P_{bi} \geq P_{bo}$$

Accordingly, when the power of the laser beam 20 is modulated in this manner, not only is it possible to form write marks in unrecorded regions of the recording layer 14, but it is possible to directly overwrite regions in which write marks are already formed with different write marks. This is described in detail below, but in order to modulate the power of the laser beam 20 in this manner, it is sufficient to modulate the current waveform (write waveform) of the original signal 21a generated by the controller 21 to a corresponding intensity.

While there is no particular limitation with respect to the specific materials for the recording layer 14, AgInSbTeGe or other SbTe eutectic materials are preferably used. In addition, the thickness of the recording layer 14 is preferably set to 5–30 nm.

The first dielectric layer 15, like the second dielectric layer 13, mainly serves the role of a protective layer for the recording layer 14, and its thickness is preferably set in the range 10–300 nm. There is no particular limitation to the material of the first dielectric layer 15, as $ZnS+SiO_2$ or the like can be used.

The transparent cover layer 16 constitutes the incident surface for laser beam 20 and its thickness is preferably set to 10–300 μm, and particularly preferably set to 50–150 μm. There is no particular limitation to the material of the transparent cover layer 16, but ultraviolet-cured resin is preferably used.

As described above, with the present invention, the recording of data is performed by irradiating a optical recording media 10 having such a constitution with laser beam 20 having its intensity modulated based on the write waveform.

The recording of data onto the optical recording media 10 is performed by forming many write marks by irradiation with laser beam 20, and the length of the write marks from their starting points to their ending points along with the distance from the ending point to the starting point of the next write mark form the data. If the EFM Plus (8-16) modulation code (also called "8-16 modulation") is adopted, the length of each write mark and the distance (edge-to-edge) between write marks are set to one of the lengths corresponding to 3T–11T and 14T (where T is the clock period). If the (1,7) RLL modulation code (also called "1-7 modulation") is adopted, these are set to one of the lengths corresponding to 2T–8T.

Figure 3:
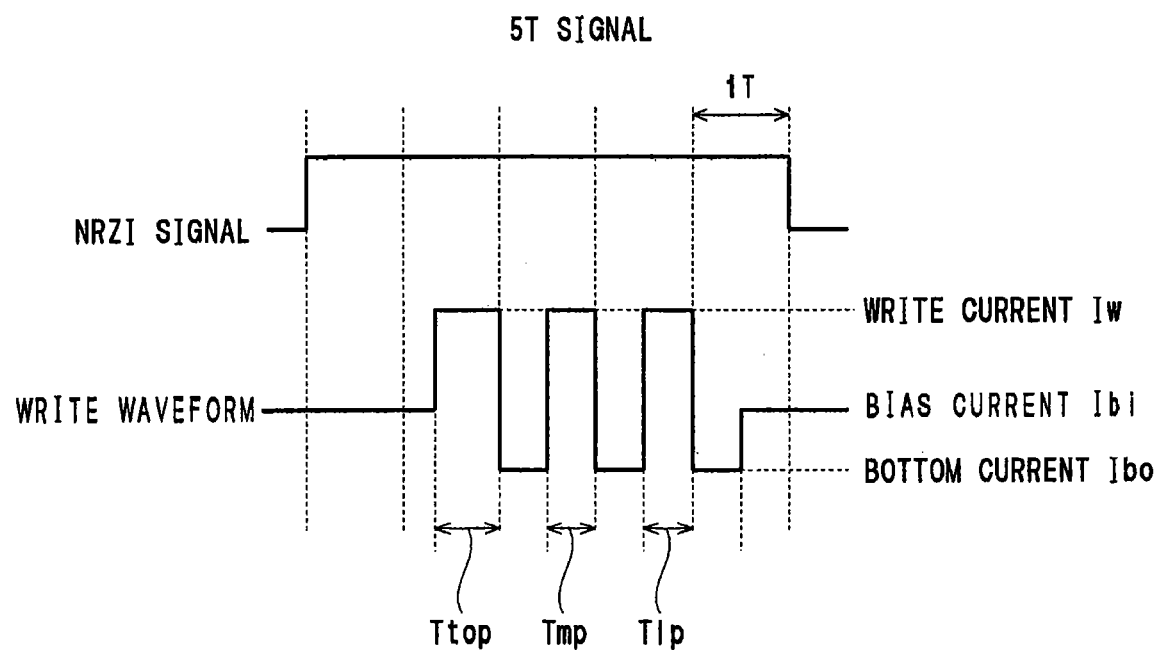
FIG. 3 is a graph showing a 5T signal and its write waveform in the case that the EFM Plus (8-16) modulation code is adopted.

FIG. 3 shows an example of a write waveform. Note that in this Specification, the write waveform means the current waveform of the original signal 21a for modulating the intensity of the laser beam 20. FIG. 3 shows a 5T signal of the NRZI signals and the write waveform corresponding to the 5T signal in the case that the EFM Plus (8-16) modulation code is adopted.

The write waveform shown in FIG. 3 has a write pulse block for forming a write mark corresponding to the 5T signal and a DC block that links adjacent write pulse blocks. The DC block is used to erase write marks in a recording system in which overwriting is possible. In FIG. 3, $I_w$ is the write current of the original signal 21a, $I_{bi}$ is the bias current of the original signal 21a, and $I_{bo}$ is the bottom current of the original signal 21a. The write pulse block has a structure wherein the combination of upward pulse (intensity $I_w$) and subsequent downward pulse (intensity $I_{bo}$) is repeated, and overall it consists of a rise from $I_{bi}$ and a return to $I_{bi}$. In the write waveform of FIG. 3, the levels of all downward pulses (bottom current $I_{bo}$) are all set lower than the bias current $I_{bi}$. Note that if the level of the original signal 21a is the write current $I_w$, the power of the laser beam 20 generated by the laser diode 23 becomes the write power $P_w$, and if the level of the original signal 21a is the bias current $I_{bi}$, the power of the laser beam 20 generated by the laser diode 23 becomes the write power $P_{bi}$, while if the level of the original signal 21a is the bottom current $I_{bo}$, the power of the laser beam 20 generated by the laser diode 23 becomes the write power $P_{bo}$. However, while this is described below, the laser driver 22 and laser diode 23 which have a stipulated amount of delay are present in the path of generation of laser beam 20, so the write waveform of the original signal 21a does not perfectly match the light-emission waveform of the laser beam 20.

In FIG. 3, $T_{top}$ is the time width of the first upward pulse (also called the top pulse), $T_{mp}$ is the time width of the upward pulses (also called the multi-pulses) sandwiched between the first upward pulse and the last upward pulse, and $T_{lp}$ is the time width of the final upward pulse (also called the last pulse). These pulse widths are represented by values that are normalized based on the reference clock width (1T), and the specific values are determined in consideration of various conditions such as the linear recording velocity, but $T_{top}$, $T_{mp}$ and $T_{lp}$ rarely all agree, and the pulse width of one of $T_{top}$, $T_{mp}$ and $T_{lp}$ is typically set to be shorter than the remaining pulse widths. To wit, typically there is a mixture of long and short upward pulse widths.

Moreover, the higher the linear recording velocity, the more difficult the formation of write marks using the simple write waveform becomes, and with regard to this, there are cases in which it becomes necessary to set a large difference in pulse widths between the upward pulses with long pulse widths and upward pulses with short pulse widths.

The write pulse block shown in FIG. 3 includes three types of upward pulses differentiated by pulse width. Note that in a write pulse block corresponding to short-length signals, the number of upward pulses may be 1 or 2.

FIG. 4 is a diagram of the write waveform in the case of recording data on optical recording media 10 using the (1,7) RLL modulation code, where (a) is the write waveform in the case of forming a 2T signal, (b) is the write waveform in the case of forming a 3T signal, (c) is the write waveform in the case of forming a 4T signal, and (d) is the write waveform in the case of forming the 5T through 8T signals.

As shown in FIGS. 4(a)–(d), in this preferred embodiment, also in the case of recording data using the (1,7) RLL modulation code, the current waveform (write waveform) of the original signal 21a is modulated to three intensities (three values) consisting of the write current ($I_w$), bias current ($I_{bi}$) and bottom current ($I_{bo}$). The strength of the write current ($I_w$) is set to such a high level that the phase-change material contained in the recording layer melts by the irradiation of the laser beam 20 ($P_w$) generated based thereupon. In addition, the strength of the bias current ($I_{bi}$) is set to a level such that the phase-change material contained in the recording layer reaches a temperature above the crystallization temperature by the irradiation of the laser beam 20 ($P_b$) generated based thereupon. Moreover, the strength of the bottom current ($I_{bo}$) is set to such a low level that molten phase-change material is cooled by the irradiation of the laser beam 20 ($P_{bo}$) generated based thereupon.

Figure 4A:
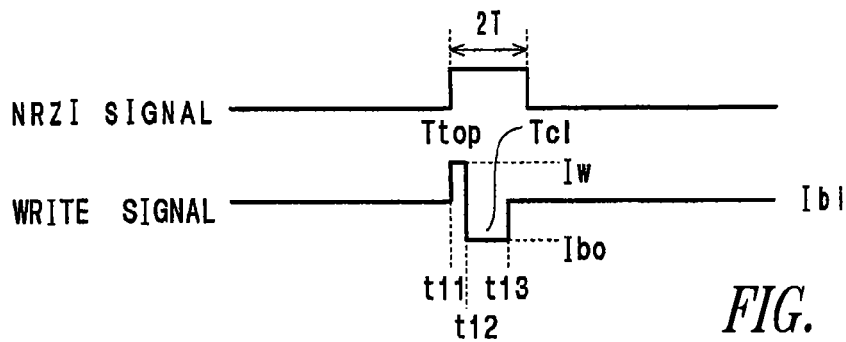
FIG. 4 is a diagram of the write waveform in the case of recording data using the (1,7) RLL modulation code, where (a) is the write waveform in the case of forming a 2T signal, (b) is the write waveform in the case of forming a 3T signal, (c) is the write waveform in the case of forming a 4T signal, and (d) is the write waveform in the case of forming the 5T through 8T signals.

First, as shown in FIG. 4(a), when a 2T signal is to be formed on the optical recording media 10, the number of upward pulses in the write waveform is set to "1" and then a cooling pulse is inserted. The "number of upward pulses" is defined to be the number of times the current of the original signal 21a is raised to the write current ($I_w$). In this Specification, among the upward pulses in the write waveform, the first pulse is called the top pulse, the final pulse is called the last pulse and the pulses present between the top pulse and last pulse are called multi-pulses, but as shown in FIG. 4(a), if the number of upward pulses is "1" then the pulse in question is the top pulse.

Accordingly, when forming a 2T signal, the current of the original signal 21a is: set to the bias current ($I_{bi}$) prior to timing $t_{11}$, set to the write current ($I_w$) in the period ($T_{top}$) from timing $t_{11}$ to timing $t_{12}$, set to the bottom current ($I_{bo}$) in the period ($T_{cl}$) from timing $t_{12}$ to timing $t_{13}$ and set to the bias current ($I_{bi}$) subsequent to timing $t_{13}$.

Figure 4B:
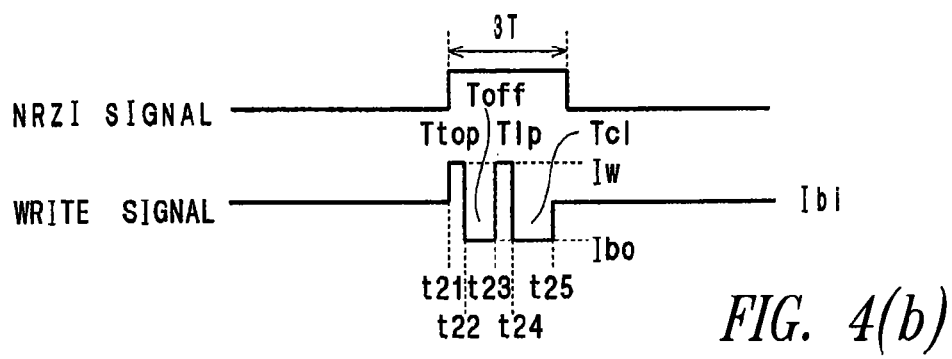
Figure 4B:
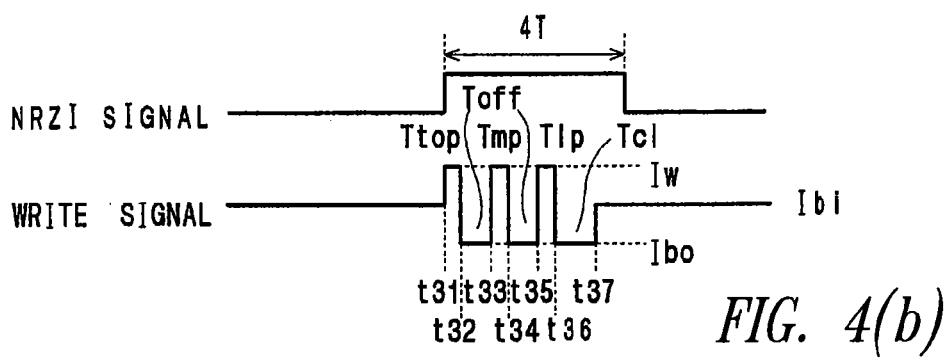

In addition, as shown in FIG. 4(b), when a 3T signal is to be formed on the optical recording media 10, the number of upward pulses in the write waveform is set to "2" and then a cooling pulse is inserted. As shown in FIG. 4(b), if the number of upward pulses is "2" then these pulses are the top pulse and the last pulse.

Accordingly, when forming a 3T signal, the current of the original signal 21a is: set to the bias current ($I_{bi}$) prior to timing $t_{21}$, set to the write current ($I_w$) in the period ($T_{top}$) from timing $t_{21}$ to timing $t_{22}$ and in the period ($T_{lp}$) from timing $t_{23}$ to timing $t_{24}$, set to the bottom current ($I_{bo}$) in the period ($T_{off}$) from timing $t_{22}$ to timing $t_{23}$ and in the period ($T_{cl}$) from timing $t_{24}$ to timing $t_{25}$ and set to the bias current ($I_{bi}$) subsequent to timing $t_{25}$.

Moreover, as shown in FIG. 4(c), when a 4T signal is to be formed on the optical recording media 10, the number of upward pulses in the write waveform is set to "3" and then a cooling pulse is inserted. Accordingly, when forming a 4T signal, the current of the original signal 21a is: set to the bias current ($I_{bi}$) prior to timing $t_{31}$, set to the write current ($I_w$) in the period ($T_{top}$) from timing $t_{31}$ to timing $t_{32}$, in the period ($T_{mp}$) from timing $t_{33}$ to timing $t_{34}$ and in the period ($T_{lp}$) from timing $t_{35}$ to timing $t_{36}$, set to the bottom current ($I_{bo}$) in the period ($T_{off}$) from timing $t_{32}$ to timing $t_{33}$, in the period ($T_{off}$) from timing $t_{34}$ to timing $t_{35}$ and in the period ($T_{cl}$) from timing $t_{36}$ to timing $t_{37}$ and set to the bias current ($I_{bi}$) subsequent to timing $t_{37}$.

Figure 4D:
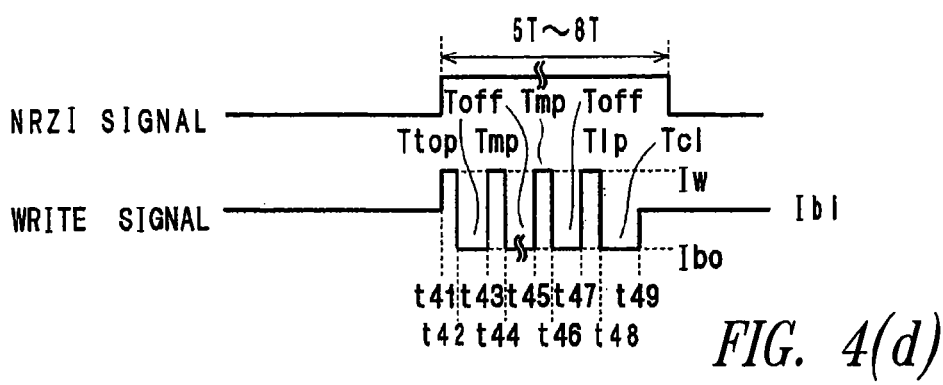

Moreover, as shown in FIG. 4(d), when a 5T signal through 8T signal is to be formed on the optical recording media 10, the number of upward pulses in the write waveform is set to "4" through "7" and then a cooling pulse is inserted. Accordingly, the number of multi-pulses is set to "2" through "5" when forming a 5T signal through 8T signal, respectively.

In this case also, the current of the original signal 21a is: set to the write current ($I_w$) in the $T_{top}$ period (period from timing $t_{41}$ to timing $t_{42}$), in the $T_{mp}$ period (period from timing $t_{43}$ to timing $t_{44}$, period from timing $t_{45}$ to timing $t_{46}$, etc.) and in the $T_{lp}$ period (period from timing $t_{47}$ to timing $t_{48}$), set to the bottom current ($I_{bo}$) in the off period $T_{off}$ (period from timing $t_{42}$ to timing $t_{43}$, period from timing $t_{46}$ to timing $t_{47}$, etc.) and in the cooling period $T_{cl}$ (period from timing $t_{48}$ to timing $t_{49}$) and set to the bias current ($I_{bi}$) during other periods.

Here, the specific values of $T_{top}$, $T_{mp}$ and $T_{lp}$ are determined in consideration of various conditions such as the linear recording velocity, but as described above, the pulse width of one of $T_{top}$, $T_{mp}$ and $T_{lp}$ is typically set to be shorter than the remaining pulse widths. In addition, the higher the linear recording velocity becomes, there are cases in which it becomes necessary to set a large difference in pulse widths between the upward pulses with long pulse widths and upward pulses with short pulse widths. For example, in the write waveform illustrated in FIG. 4, if the linear recording velocity is 6.5 m/s, then the following are set:

$T_{top}$=0.5 $T_w$,
$T_{mp}$=0.4 $T_w$,
$T_{lp}$=0.5 $T_w$ and if the linear recording velocity is 14.6 m/s, then the following are set:

$T_{top}$=0.5 $T_w$,
$T_{mp}$=0.35 $T_w$,
$T_{lp}$=0.5 $T_w$.

A original signal 21a that has the write waveform as described above is supplied to the laser driver 22 as described above and the laser driver 22 generates the drive signal 22a based thereupon. Moreover, the laser beam 20 is generated by the laser diode 23 based on the drive signal 22a and the recording layer 14 of the optical recording media 10 is irradiated via the optical system 24.

By means of the above, in the regions in which the write signal (2T signal-8T signal) is to be formed, the phase-change material that is melted by irradiation with the laser beam 20 of the intensity ($P_w$) based on the write current ($I_w$) is cooled by the cooling pulse and assumes the amorphous state. On the other hand, in other regions, phase-change material irradiated with laser beam 20 of the intensity ($P_{bi}$) based on the bias current ($I_{bi}$) is heated to a temperature above the crystallization temperature and is gradually cooled by the laser beam 20 leaving thereafter, and assumes the crystalline state.

As described previously, the drive current waveform of the drive signal 22a generated by the laser driver 22 fundamentally corresponds to the write waveform of the original signal 21a, but a stipulated delay is present in the drive operation of the laser driver 22, so a certain amount of delay occurs with respect to the write waveform. Moreover, there is also a small amount of delay present in the light emission operation of the laser diode 23, so the actual light-emission waveform also has a small amount of delay with respect to the drive current waveform. For this reason, if the upward pulse width of the write waveform is set to be extremely short in order to increase the transfer rate, the laser beam 20 corresponding to the short-width upward pulses attenuates before reaching the recording power. For this reason, laser beam 20 that strictly conforms to the write waveform cannot be obtained. The appearance of this is shown in FIG. 5.

Figure 5A:
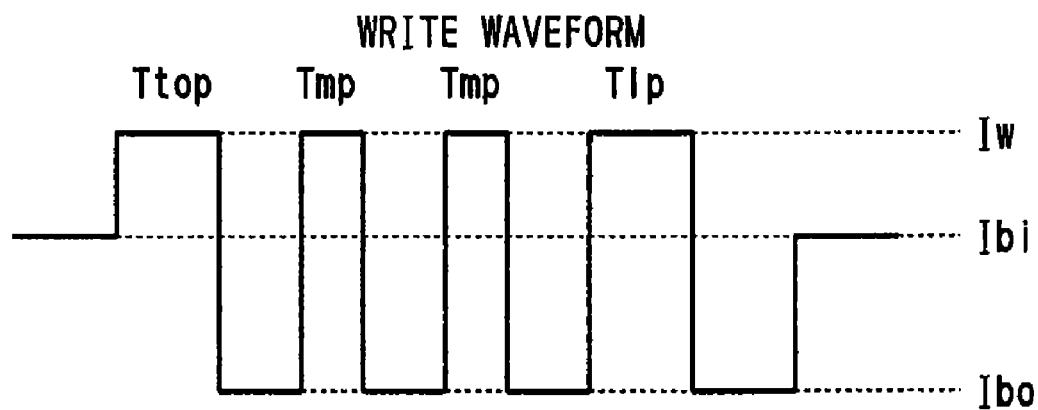
FIG. 5 is a diagram used to describe the problems in the case in which compensation according to the present invention is not performed, where (a) and (b) are schematic waveform diagrams of the write waveform and light-emission waveform, respectively, in the case of forming a 5T signal by the (1,7) RLL modulation code.

FIGS. 5(a) and (b) are schematic waveform diagrams of the write waveform and light-emission waveform, respectively, in the case of forming a 5T signal by the (1,7) RLL modulation code.

Figure 5B:
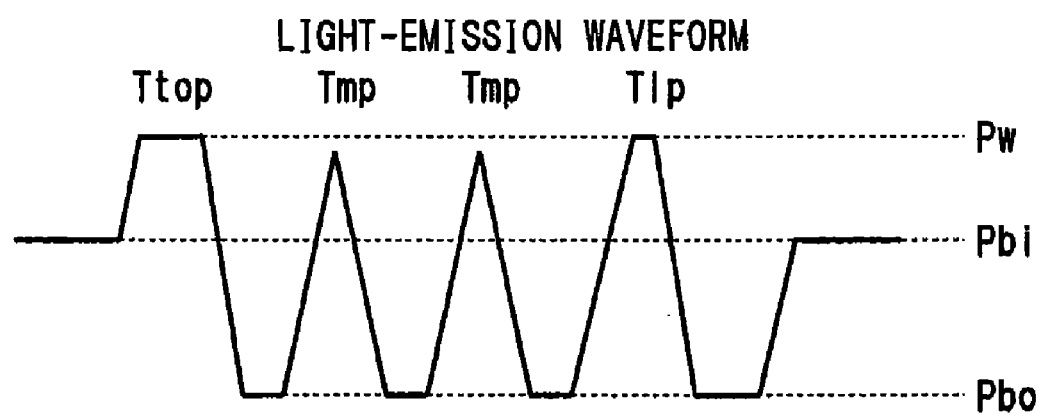

As shown in FIGS. 5(a) and (b), the light-emission waveform fundamentally corresponds to the write waveform, but because of the effect of the delay due to the laser driver 22 and laser diode 23 (mainly the delay due to the laser driver 22), the light-emission waveform becomes a waveform with a stipulated slope. For this reason, as shown in FIG. 5(a), when $T_{mp}$ is shorter than $T_{top}$ and $T_{lp}$ in the write waveform, depending on the linear recording velocity, as shown in FIG. 5(b), the portions corresponding to the multi-pulses within the light-emission waveform attenuate before reaching the peak value ($P_w$). If the peak intensity in the light-emission waveform is low in this manner, heating of the recording layer becomes inadequate.

In order to compensate for this attenuation before reaching the peak in the light-emission waveform, in the present invention, the intensity of stipulated upward pulses in the write waveform is increased. If the intensity of upward pulses in the write waveform is increased, the angle of the rise of the laser beam 20 becomes steeper so a rise to the desired peak intensity can be achieved. Thereby, it is possible to compensate for the decrease in the peak intensity in the light-emission waveform. Thereby, the intensity of the various pulses in the light-emission waveform can be brought to their setpoints (the peak values they should have) or values near thereto, so recording and playback characteristics identical to those in the case of a low transfer rate can be achieved.

In the present invention, the control of the intensity of upward pulses in the write waveform is preferably performed as follows.

Let $T_R$ be the overall rise time of the laser driver 22 and laser diode 23 used in recording. Let $T_{UP}$ be the time width of the upward pulses (e.g., $T_{top}$, $T_{mp}$ and $T_{lp}$ in FIGS. 3–5). In the event that upward pulses wherein $T_{UP} \leq kT_R$ are present in the write pulse block, then the intensity of the upward pulse is controlled according to the present invention. The constant k is no greater than 1.5, preferably 1.2 and more preferably 1.0.

Figure 6:
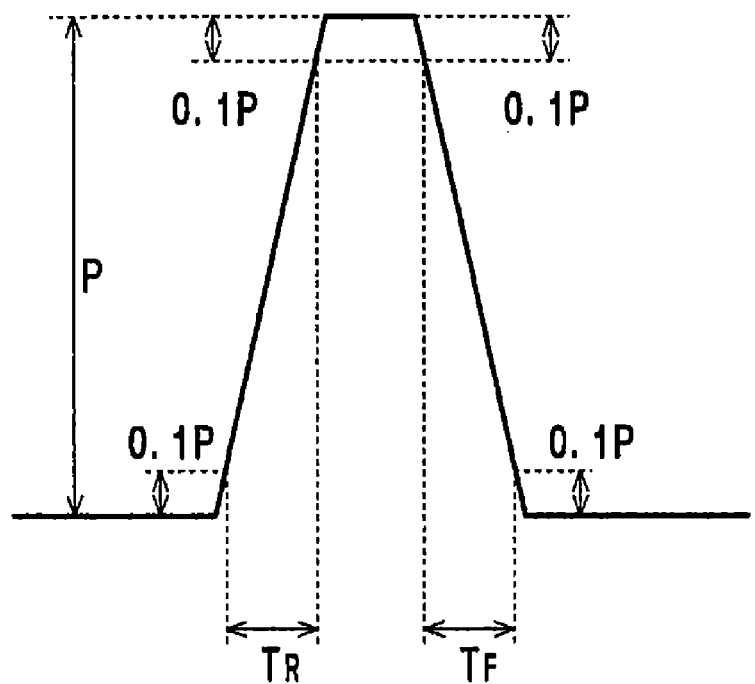
FIG. 6 is a graph that schematically shows the light-emission waveform.

Here follows a description of the overall rise time and fall time of the laser driver 22 and laser diode 23. FIG. 6 is a waveform diagram that schematically shows the light-emission waveform of a laser diode 23 driven based on a write waveform that has a single rectangular upward pulse. The "rise time" in this Specification is defined to be, when current is applied to the laser diode 23 by the laser driver 22, the time from when the beam intensity becomes 10% of the peak value (P in FIG. 6) until the beam intensity becomes 90% of the peak value. On the other hand, "fall time" is defined to be, when the supply of current to the laser diode 23 by the laser driver 22 is halted (reduced), the time from when the beam intensity becomes 90% of the peak value until the beam intensity becomes 10% of the peak value. Typically, the rise time becomes longer than the fall time. In addition, the aforementioned rise time and fall time are dominated by delay due to the laser driver 22, so the drive current waveform of the laser driver 22 roughly matches the light-emission waveform shown in FIG. 6.

The control of the peak intensity according to the present invention is performed by, at the time that the laser diode 23 emits beam corresponding to an upward pulse wherein $T_{UP} \leq kT_R$, increasing the intensity of the upward pulse (write current $I_w$) to above the intensity of the upward pulses wherein $T_{UP} > kT_R$. To wit, the decrease in the peak intensity of the light-emission waveform is compensated for by making the intensity of the upward pulses of the write waveform wherein $T_{UP} \leq kT_R$ even higher. Here follows a description of the effect of the compensation according to the present invention made with reference to drawings.

FIG. 7 is a diagram used to describe the effect of compensation according to the present invention, where (a) and (b) are schematic waveform diagrams of the write waveform and light-emission waveform, respectively, in the case of forming a 5T signal by the (1,7) RLL modulation code. Note that this diagram is comparable to the diagram in FIG. 5 above.

Figure 7A:
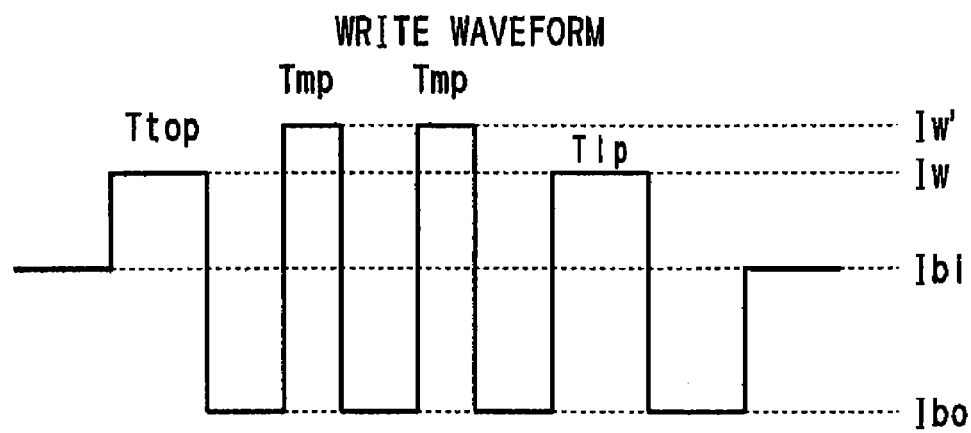
FIG. 7 is a diagram used to describe the effect of compensation according to the present invention, where (a) and (b) are schematic waveform diagrams of the write waveform and light-emission waveform, respectively, in the case of forming a 5T signal by the (1,7) RLL modulation code.

As shown in FIG. 7(a), in this example, $T_{mp}$ is shorter than $T_{top}$ and $T_{lp}$ in the write waveform, so the intensity of the pulse corresponding to $T_{mp}$ is set higher than the intensity of the pulses corresponding to $T_{top}$ and $T_{lp}$. To wit, the relationship between the write current $I_w'$ corresponding to $T_{mp}$ and the write current $I_w$ corresponding to $T_{top}$ and $T_{lp}$ is set to:

$I_w' > I_w$.

Figure 7B:
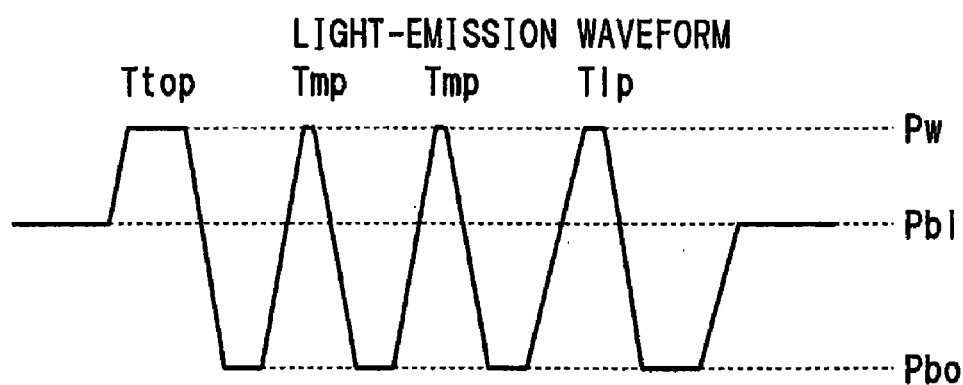

Thereby, as shown in FIG. 7(b), the portion corresponding to the multi-pulses within the light-emission waveform also reaches the peak value ($P_w$), so the recording layer can be adequately heated.

In the present invention, in the event that at least two upward pulses wherein $T_{UP} \leq kT_R$ and that have a different $T_{UP}$ are present in the write waveform, these upward pulses are preferably divided into at least two groups depending on the length of their respective $T_{UP}$. In this case, when one upward pulse each belongs to each group, it is sufficient to control the peak intensity for each pulse individually depending on the time width of each pulse. Specifically, the shorter the $T_{UP}$, the lower the peak value in the light-emission waveform becomes, so the shorter the $T_{UP}$ of an upward pulse, the larger the peak intensity becomes. Thereby, the intensity of the various pulses in the light-emission waveform can be brought to their setpoints (the peak values they should have) or values near thereto.

However, in the case that there are a relatively large number of different pulse widths, complicated control is required in order to control the pulse intensity for each pulse width individually, so the load on the controller 21 becomes large. In contrast, if a plurality of upward pulses with small differences between their time widths belongs to at least one of the aforementioned groups, the number of groups subject to control is reduced, thereby simplifying control. In this case, the upward pulses in each group are given the same peak intensity, and the peak intensity in groups that contain upward pulses with a relatively short $T_{UP}$ is made larger than the peak intensity in groups that contain upward pulses with a relatively long $T_{UP}$. Thereby, the intensity of the various pulses in the light-emission waveform can be brought to their setpoints (the peak intensities they should have) or values near thereto.

Note that in the light-emission waveform, even if all pulses do not assume the peak intensities they should have, as long as they are roughly somewhat less than or roughly somewhat more than the peak intensity they should have, an effect of improving the recording and playback characteristics can be achieved.

In addition, in order to simplify control further, it is sufficient to use the same peak intensity for all upward pulses wherein $T_{UP} \leq kT_R$. The peak intensity in this case is made larger than the peak intensity of upward pulses wherein $T_{UP} > kT_R$.

Moreover, the present invention applies not only to the case wherein both upward pulses wherein $T_{UP} \leq kT_R$ and upward pulses wherein $T_{UP} > kT_R$ are present, but also to the case wherein all upward pulses have $T_{UP} \leq kT_R$.

With the present invention, there is no need for the all of the upward pulses in the light-emission waveform to have the same peak intensity. At the time of optimizing the write waveform, the peak intensity may be set differently for each pulse. When the present invention is applied to a case in which such a write waveform is used, it is sufficient to control the write waveform so that the peak intensity of each pulse within the light-emission waveform becomes the setpoint. To wit, it is sufficient to increase the peak intensity depending on the pulse width $T_{UP}$ in stipulated pulses of the write waveform so that the intensity of the various pulses in the light-emission waveform can be brought to their setpoints (the demanded peak intensities they should have) or values near thereto.

Note that if $T_{UP}$ becomes extremely short, even if the write current $I_w$ is increased, it becomes difficult to compensate completely for the peak value. Thus, in order to obtain marked effects with the present invention, the present invention should preferably be applied when the following relationships apply:

| | |
|---|---|
| <0.1T | $_{UP}/T_R$, or more preferably, |
| <0.2T | $_{UP}/T_R$, or even more preferably, |
| <0.3T | $_{UP}/T_R$. |

The present invention is applicable, with no particular limitations, to optical recording media wherein recording is performed by irradiation with laser beam and whose recording and playback characteristics are affected by changes in the intensity of the irradiated laser beam, e.g., phase-change type optical recording media and magneto-optical recording media and the like.

EXAMPLES

A sample optical recording disc was manufactured by preparing a disc-shaped polycarbonate substrate 120 mm in diameter and 1.2 mm thick with the groove formed simultaneously by injection molding, and forming on its surface a reflective layer, second dielectric layer, recording layer, first dielectric layer and transparent cover layer by the procedure given below.

The reflective layer has a thickness of 100 nm and was formed by sputtering in an argon (Ar) atmosphere using $Ag_{98}Pd_1Cu_1$ as the target. The second dielectric layer has a thickness of 20 nm and was formed by sputtering in an Ar atmosphere using $Al_2O_3$ as the target. The recording layer has a thickness of 12 nm and was formed by sputtering in an Ar atmosphere. The composition of the recording layer is:

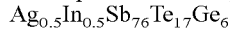

$Ag_{0.5}In_{0.5}Sb_{76}Te_{17}Ge_6$ on an atom ratio. The first dielectric layer has a thickness of 130 nm and was formed by sputtering in an Ar atmosphere using ZnS (85 mol %)-$SiO_2$ (15 mol %) as the target. The transparent cover layer has a thickness of 100 μm and was formed by spin-coating ultraviolet-cured resin and curing by irradiating with ultraviolet beam.

The sample thus manufactured was initialized with a bulk eraser and then set onto an optical recording media evaluation equipment (wavelength: 405 nm, aperture ratio NA=0.85), and then recording was performed using a (1,7) RLL-modulated signal. Table 1 shows the rise time $T_R$ and fall time $T_F$ found in this evaluation equipment. Note that $T_R$ and $T_F$ are measured by the following procedure. The optical output of the laser diode is converted to a voltage by an O/E converter and displayed on an oscilloscope. The time for the output to rise from 10% to 90% is taken to be the rise time $T_R$, while the time for the output to fall from 90% to 10% is taken to be the fall time $T_F$. Note that for reference, the time $T_{R100}$ for the power to rise from 0% to 100% and the time $T_{F100}$ for the power to fall from 100% to 0% are also listed on Table 1.

In the write waveform, taking $T_w$ to be the detection window width, if the linear recording velocity is 14.6 m/s, then:

$T_{top}=0.5\ T_w$,
$T_{mp}=0.35\ T_w$,
$T_{lp}=0.5\ T_w$.

and at other linear recording velocities, the following apply:

$T_{top}=0.5\ T_w$,
$T_{mp}=0.4\ T_w$,
$T_{lp}=0.5\ T_w$.

$T_w$ was changed depending on the linear velocity in order to make the bit length 0.13 μm at all linear velocities. Table 1 presents the linear velocity during recording and the $T_{top}$, $T_{mp}$ and $T_{lp}$ at each linear velocity along with the original signal current values $I_{top}$, $I_{mp}$ and $I_{lp}$ corresponding to each. Note that $I_{top}$, $I_{mp}$ and $I_{lp}$ are presented as relative values.

After recording, signal playback was performed and the playback amplitude (voltage level) $RF_{pp}$ was measured. In addition, jitter was measured by means of a time interval analyzer. This jitter is the clock jitter calculated by:

σ/Tw (unit: %)

These results are shown in Table 1.

TABLE 1

| Case No. | Linear velocity (m/s) | $T_R$ (ns) | $T_{R100}$ (ns) | $T_F$ (ns) | $T_{F100}$ (ns) | Ttop (ns) | Tmp (ns) | Tlp (ns) | Itop:Imp:Ilp | RFpp (mV) | Jitter (%) |
|---|---|---|---|---|---|---|---|---|---|---|---|
| 1 (Comparison) | 6.5 | 2.1 | 3.2 | 1.8 | 2.7 | 6.7 | 5.3 | 6.7 | 1.00:1.00:1.00 | 133 | 7.3 |
| 2 (Comparison) | 9.8 | 2.1 | 3.2 | 1.8 | 2.7 | 4.4 | 3.8 | 4.4 | 1.00:1.00:1.00 | 135 | 7.5 |
| 3 (Comparison) | 14.6 | 2.1 | 3.2 | 1.8 | 2.7 | 3.0 | 2.1 | 3.0 | 1.00:1.00:1.00 | 110 | 10.2 |

TABLE 1-continued

| Case No. | Linear velocity (m/s) | $T_R$ (ns) | $T_{R100}$ (ns) | $T_F$ (ns) | $T_{F100}$ (ns) | Ttop (ns) | Tmp (ns) | Tlp (ns) | Itop:Imp:Ilp | RFpp (mV) | Jitter (%) |
|---|---|---|---|---|---|---|---|---|---|---|---|
| 4 | 14.6 | 2.1 | 3.2 | 1.8 | 2.7 | 3.0 | 2.1 | 3.0 | 1.15:1.52:1.15 | 125 | 8.6 |
| 5 | 14.6 | 2.1 | 3.2 | 1.8 | 2.7 | 3.0 | 2.1 | 3.0 | 1.15:1.52:1.28 | 133 | 7.9 |

In Table 1, in Cases No. 1 and No. 2, the proportion $I_{top}:I_{mp}:I_{lp}$ is 1:1:1 when the compensation according to the present invention is not performed. However, in these cases, the linear velocity (transfer rate) is low and each of $T_{top}$, $T_{mp}$ and $T_{lp}$ is greater than 1.5 $T_R$ (=3.15 ns). For this reason, $RF_{pp}$ is sufficiently large and jitter is small. On the other hand, in Case No. 3, high-linear-velocity recording is performed so that all of $T_{top}$, $T_{mp}$ and $T_{lp}$ are shorter than 1.0 $T_R$ (=3.15 ns), and moreover the compensation according to the present invention was not performed so $RF_{pp}$ became very low and jitter is became large.

In contrast, in Cases No. 4 and No. 5 wherein the linear velocity was set to the same as in Case No. 3 and the original signal current value was increased corresponding to the time width of each pulse, the $RF_{pp}$ and jitter were improved.

In addition, in Case No. 5, $I_{lp}$ is increased in comparison to Case No. 4. To wit, the original signal current value corresponding to the last pulse is increased. For this reason, Case No. 5 had $RF_{pp}$ and jitter improved in comparison to Case No. 4.

Figure 8:
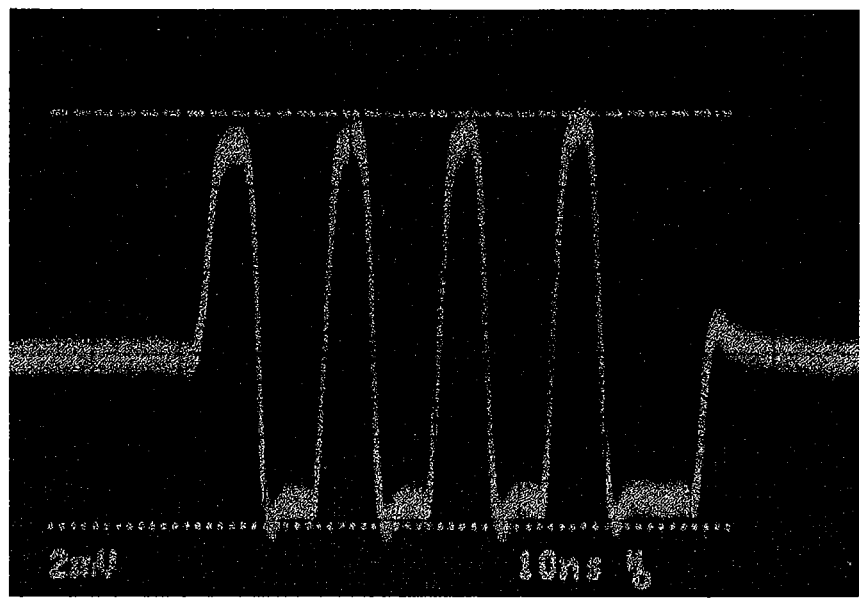
FIG. 8 is a graph showing the temporal transition in laser beam intensity in Case No. 1 of Table 1.
Figure 9:
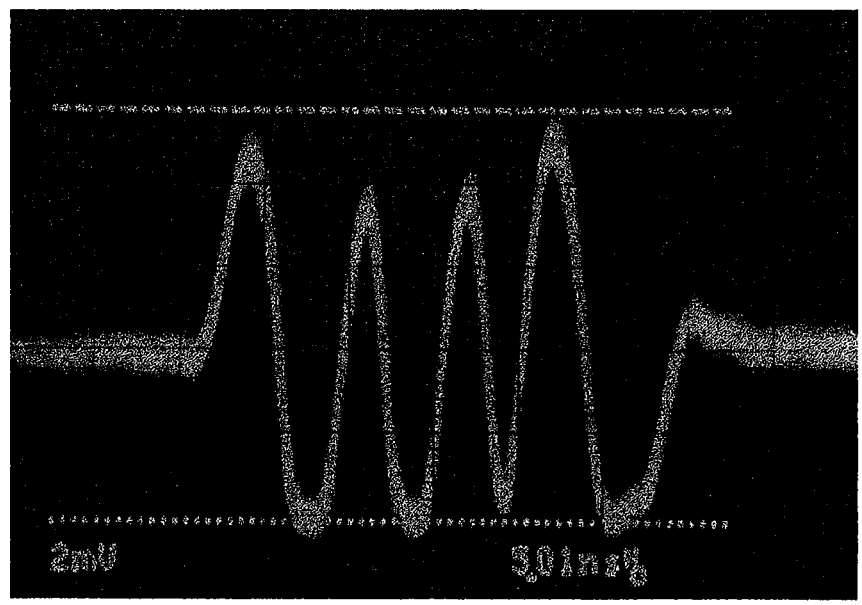
FIG. 9 is a graph showing the temporal transition in laser beam intensity in Case No. 3 of Table 1.
Figure 10:
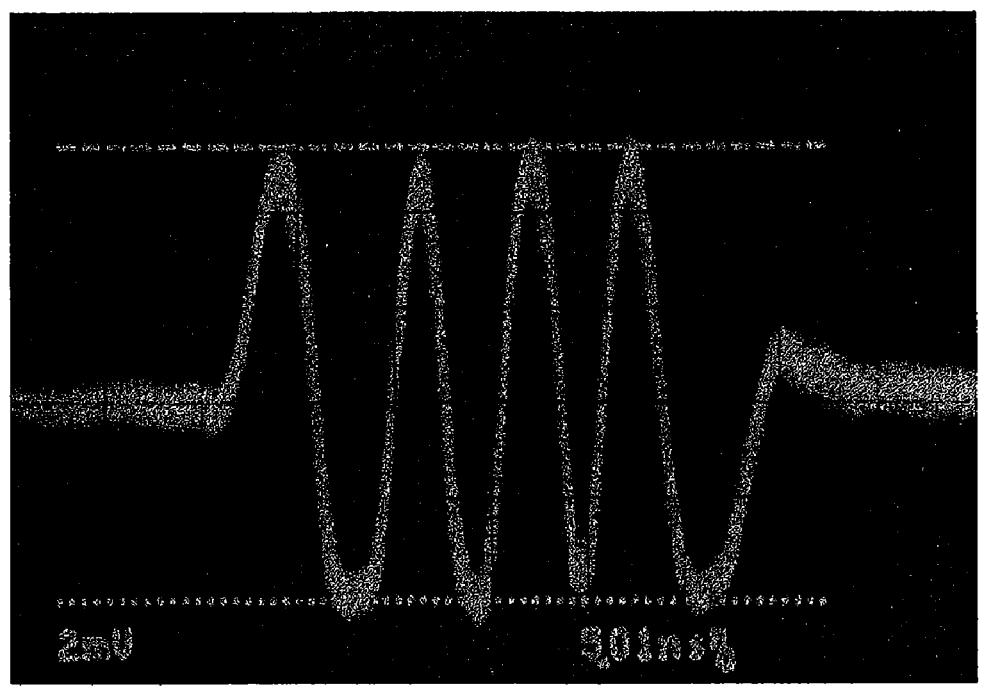
FIG. 10 is a graph showing the temporal transition in laser beam intensity in Case No. 4 of Table 1.

Note that FIGS. 8, 9 and 10 are graphs that show the laser light-emission waveforms in Cases No. 1, No. 3 and No. 4 of Table 1.

As explained in the foregoing, since the invention sets the intensity of the write current $I_w$ of the original signal based on the pulse width of the upward pulse of the write waveform and the characteristics of the laser diode, good recording and playback characteristics can be obtained even when recording at a high transfer rate.

The invention claimed is:

1. An optical recording method that performs recording by irradiating optical recording media with at least a laser beam modulated in intensity based on a write waveform, wherein:
    said write waveform has a plurality of write pulse blocks for forming write marks, and each write pulse block has at least one type of upward pulse;
    a rise time of said laser beam is defined as $T_R$ and a time width of said upward pulse is as defined $T_{UP}$; and
    when at least one type each of an upward pulse wherein $T_{UP} \leq kT_R$ (where k=1.5) and an upward pulse wherein $T_{UP} > kT_R$ are present in said write waveform, a peak intensity of the upward pulses wherein $T_{UP} \leq kT_R$ is increased to above the peak intensity of the upward pulses wherein $T_{UP} > kT_R$.

2. An optical recording method as claimed in claim 1, wherein when at least two types of upward pulses wherein $T_{UP} \leq kT_R$ and that have a different $T_{UP}$ are present in said write waveform, these upward pulses are divided into at least two groups depending on a length of their $T_{UP}$ so that each group contains at least one type of upward pulse, the peak intensities of the upward pulses in each group are made identical, and the peak intensity in groups that contain upward pulses with a relatively short $T_{UP}$ is made larger than the peak intensity in groups that contain upward pulses with a relatively long $T_{UP}$.

3. An optical recording method as claimed in claim 1, wherein when at least two types of upward pulses wherein $T_{UP} \leq kT_R$ and that have a different $T_{UP}$ are present in said write waveform, the peak intensity is made the same in all of these upward pulses.

4. An optical recording method that performs recording by irradiating optical recording media with at least a laser beam modulated in intensity based on a write waveform, wherein:
    said write waveform has a plurality of write pulse blocks for forming write marks, and each write pulse block has at least one type of upward pulse;
    a rise time of said laser beam is defined as $T_R$ and a time width of said upward pulse is as defined $T_{UP}$; and
    when upward pulses wherein $T_{UP} \leq kT_R$ (where k=1.5) are present in said write waveform, a peak intensity of these upward pulses is increased so that, in said laser beam, a beam intensity it should have or a value close thereto is obtained.

5. An optical recording method that performs recording by irradiating optical recording media with at least a laser beam modulated in intensity based on a write waveform, wherein:
    said write waveform has a plurality of write pulse blocks for forming write marks, and each write pulse block has at least one type of upward pulse,
    a rise time of said laser beam is defined as $T_R$ and a time width of said upward pulse is defined as $T_{UP}$, and
    when all of the upward pulses contained in said write waveform have $T_{UP} \leq kT_R$ (where k=1.5), these upward pulses are divided into at least two groups depending on a length of their $T_{UP}$ so that each group contains at least one type of upward pulse, peak intensities of the upward pulses in each group are made identical, and the peak intensity in groups that contain upward pulses with a relatively short $T_{UP}$ is made larger than the peak intensity in groups that contain upward pulses with a relatively long $T_{UP}$.

6. An optical recording method that performs recording by irradiating optical recording media with at least a laser beam modulated in intensity based on a write waveform, comprising:
    forming write marks using the write waveform having a plurality of write pulse blocks, wherein each of the plurality of write pulse blocks has at least one type of upward pulse; and
    increasing a peak intensity of each of the upward pulses having a time width that is less than or equal to 1.5 times a rise time of each associated laser beam to a value above the peak intensity of each of the upward pulses having the time width that is greater than 1.5 times the rise time of each associated laser beam, in the event that there is at least one upward pulse having the time width that is less than or equal to 1.5 times the rise time of the associated laser beam.

* * * * *